Dec. 20, 1966  A. J. WALSH  3,292,882
STALL-CORRECTING APPARATUS FOR AIRCRAFT
Filed March 4, 1965  2 Sheets-Sheet 2

Inventor
Alban Joseph Walsh
By
Nolte & Nolte
Attorneys

United States Patent Office
3,292,882
Patented Dec. 20, 1966

3,292,882
STALL-CORRECTING APPARATUS FOR AIRCRAFT
Alban J. Walsh, Weybridge, England, assignor to British Aircraft Corporation (Operating) Limited, London, England, a British company
Filed Mar. 4, 1965, Ser. No. 437,082
9 Claims. (Cl. 244—76)

This invention relates to stall-warning and correcting apparatus for aircraft.

The object of this invention is to provide means for giving automatic warning of an incipient stall and for automatically effecting corrective operation of the elevator, primarily for use in aircraft which do not possess the characteristic inherent ability to give warning of the approach to stall conditions, e.g. by buffet and/or wing dropping and/or by dropping the nose.

The invention provides for this purpose apparatus including incidence sensing means adapted to cause a first signal (a stall warning signal) to be generated when the aircraft angle of incidence exceeds a first given value and to cause a second signal (a stall identification signal) to be generated when the said angle of incidence exceeds a second, higher, value, a stall warning signal from the incidence sensing means to actuate said stall warning device and means for transmitting said stall identification signal from the incidence sensing means to actuate the elevators so as to impart a pitch down motion to the aircraft.

One embodiment of the invention will now be described in more detail by way of example and with reference to the accompanying drawings, in which.

In the apparatus according to the invention, a single incidence sensing device may be arranged to generate a first signal (a stall warning signal) which actuates a stall warning device such as a stick shaking device when a first given angle of incidence is attained on the approach to stall conditions, and to generate a second signal (a stall identification signal) which actuates the elevator controls if a second, higher, angle of incidence is attained at which corrective action is necessary to prevent stalling. In this way, the pilot is given a warning of imminent stall conditions and if he takes corrective manual action in good time automatic corrective action is avoided.

Figure 1:
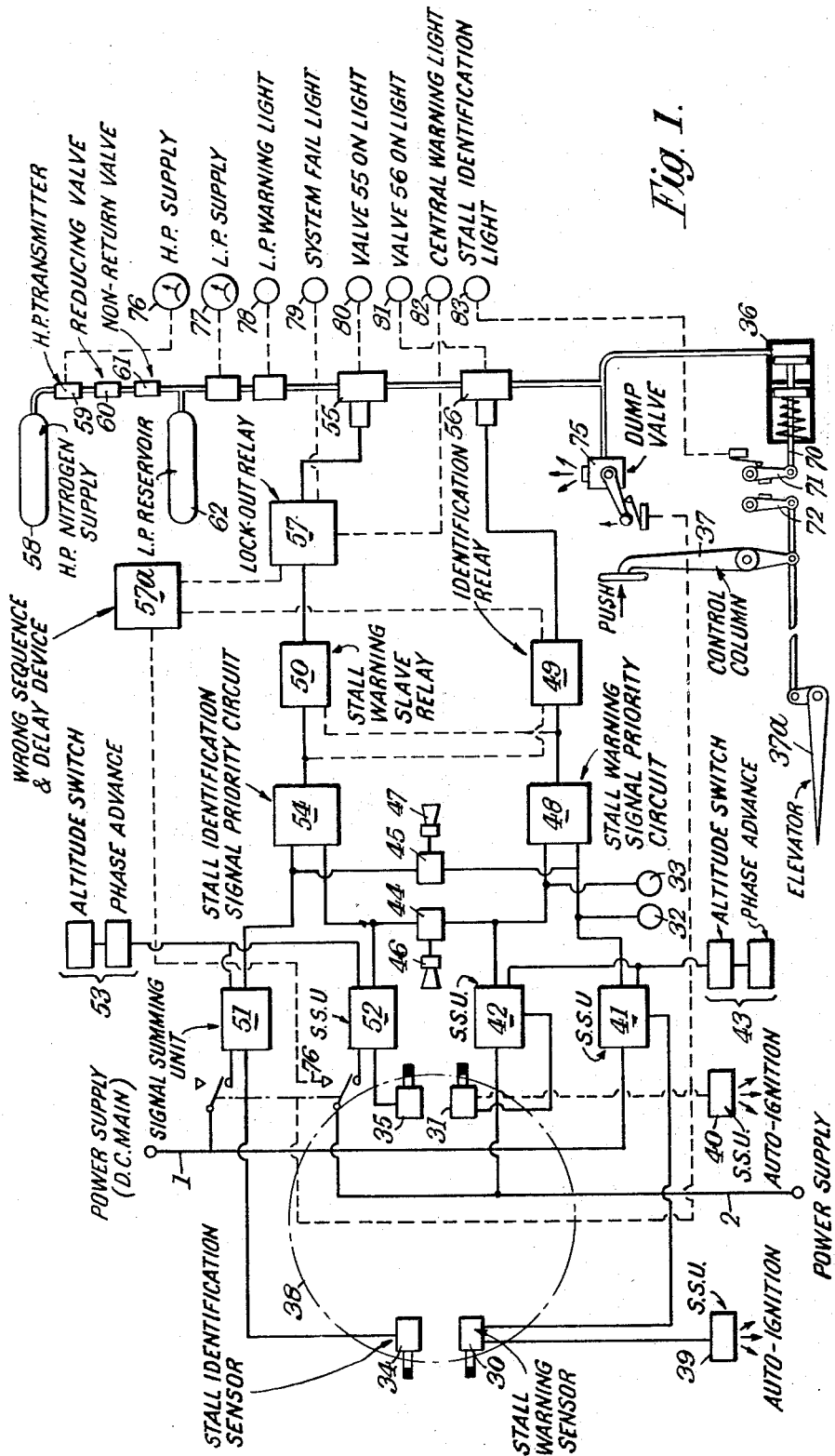
FIG. 1 is a diagram of one form of stall warning and correcting apparatus.
Figure 2:
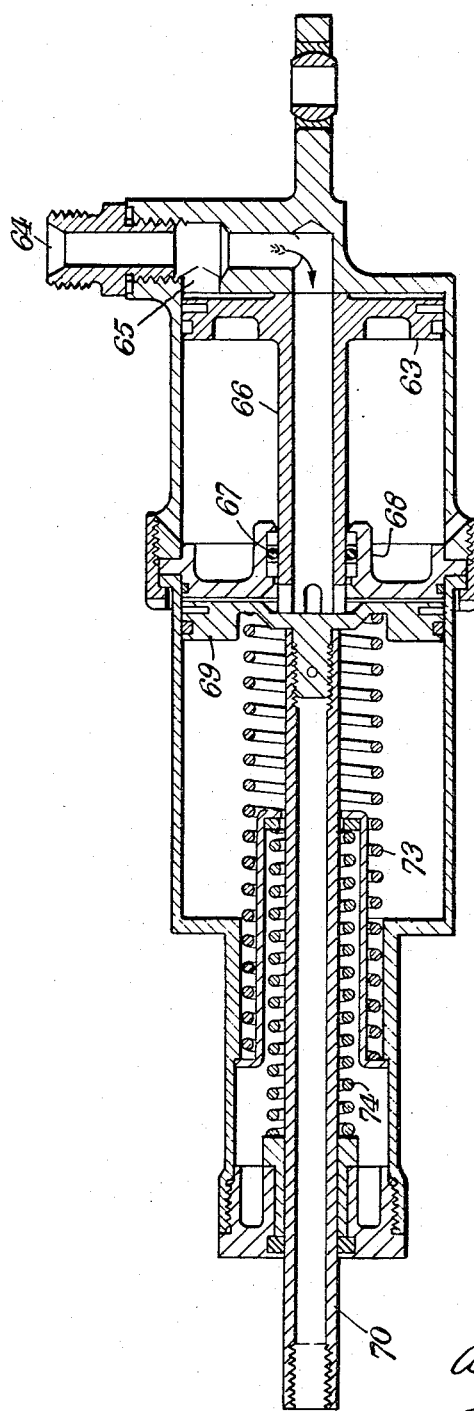
FIG. 2 is a section through a ram for use in the apparatus of FIG. 1.

In the form of apparatus illustrated in FIGS. 1 and 2, a pair of incidence sensing devices 30, 31 produces a stall warning signal at the first given angle of incidence and actuates the stick shaking devices 32, 33 while a second separate pair of incidence sensing devices 34, 35 produces a stall identification signal if the aircraft reaches the second, higher, angle of incidence, and actuates a ram 36 which pushes the control column or stick 37 forward to depress the elevators 37a. In the particular embodiment illustrated, which is designed for an aircraft having pure jet engines which may be liable to flame out at high angles of incidence, the stall warning sensors 30, 31 also actuate automatic ignitors for the engines.

In FIG. 1, solid lines are used for the principal electrical connections and broken lines for the subsidiary ones, while pneumatic connections are shown by double lines.

In normal use, the aircraft angle of incidence would never reach the second pre-determined angle which actuates the stick push system and it is fitted only as a precaution. The reason for the two definite stages in operation is that correction of an incipient stall is best achieved by the pilot, who can adjust the rate of correction according to circumstances and to avoid discomfort to passengers. As before stated the stick pusher only operates as a last resort in emergency conditions.

The stall warning part of the apparatus will first be described with respect to FIG. 1. The two angles of incidence sensors 30 and 31 are mounted one on each side of the aircraft fuselage, shown diagrammatically at 38. The sensors may be of the Giannini paddle vane or other suitable type and are capable of being freely rotated. Two output signals are taken from each of these sensors.

One signal from each is fed via signal summing units 39 and 40 respectively to an ignitor system (not shown) in each propulsion engine. It is arranged that each engine has two sets of ignitors and the output from one signal summing unit is led to the first ignitor in each engine and the output of the other signal summing unit is led to the second ignitor in each engine. This ensures that if an engine flames out due to the high angle of incidence, it is immediately re-lit.

The further signals from each sensor 30, 31 are led to signal summing units 41 and 42 respectively, the outputs from which are compensated for altitude by a phase advance network controlled by an altitude switch indicated at 43, and are led to arming relays 44 and 45 associated with klaxon horns 46 and 47 respectively. The output signals are also passed to the stick shaking devices 32 and 33 which are connected to the pilot's and co-pilot's control columns. One such control column is illustrated at 37. The signal summing units 41, 42 are supplied from D.C. mains power supply lines 1, 2, respectively.

The output signals of both signal summing units 41 and 42 unite at a priority circuit unit 48, which comprises three relays. The signal from the first of the two stall warning sensors 30, 31 to reach its stall warning position is passed to this unit and locks out the signal from the second stall warning sensor when it arrives. This second or later signal is thus held as an assurance against the failure of the first signal, in which event it will be allowed to pass through. If signals from both stall warning sensors arrive substantially simultaneously the priority circuit unit is arranged to give preference of passage to the second signal. The operative signal will then proceed to arm a stall identification relay 49 and also a stall warning slave relay 50.

Therefore when the aircraft assumes the first pre-determined high angle of incidence at which the stall warning sensors 30 and 31 are at or beyond their critical setting, there will be two stick shakers 32 and 33 operating, two klaxon horns 46 and 47 armed, and two relays 49 and 50 also armed and ready to release stick pusher operating signals if such are eventually generated. If and when the aircraft angle of incidence returns to a value below the critical setting of the stall warning sensors 30 and 31, the stick shakers 32 and 33 stop operating and all the other signals are cancelled.

Should the pilot for any reason fail to respond to the stall warning given by the stick shakers 32, 33, so that there is a further increase of the aircraft angle of incidence to the second pre-determined value, the stick pusher sub-system will operate. Its effect, in addition to blowing the klaxons 46, 47, is to give a sharp forward thrust to the control column 37 which provides unmistakable identification of the stall and immediate initiation of stall recovery. As soon as the aircraft incidence is reduced to a pre-determined angle the stick push is cancelled.

The stick pusher sub-system comprises the two stall identification sensors 34 and 35 which are mounted on each side of the fuselage 38 and are similar, but additional, to the sensors 31 and 32 used for stall warning. The signals from these two sensors 34 and 35 pass to signal summing units 51 and 52 fed by the D.C. mains 1, 2 through a switch 76. As with the stall warning system, the output from these summing units is compensated for altitude by a phase advance network at 53. The signal from the first stall identification sensor of the two to reach its critical angle actuates one of the relays 44 or 45 and causes its associated klaxon horn 46 or 47 to sound. This signal is then passed to a priority circuit 54 which comprises three relays and functions in exactly the same fashion as the stall warning priority circuit 48. The output signal from the priority circuit 54 then completes the circuits in both the relay 50 and the relay 49, thus permitting the signals to pass through to two pneumatic selector valves 55 and 56.

Included in this network is a lock-out device 57 controlled by a wrong sequence and delay device 57a, which comes into operation to actuate the kill switch 76 if the stall warning and stall identification signals arrive in the wrong sequence. This would be the result of a malfunction in the system and the stick push effect is inhibited until the aircraft has been returned to normal flight conditions.

The pneumatic ram-operating system comprises a high pressure nitrogen reservoir 58 which may for instance have a maximum normally charged pressure of 1500 p.s.i. and a minimum pressure limit of 500 p.s.i. This reservoir is piped via a stop valve 59 to a pressure reducing valve 60, which lowers the nitrogen pressure to 57 p.s.i. The low pressure supply then passes through a non-return valve 61 which ensures that, in case of failure by leakage of the high pressure supply, sufficient nitrogen is held in the system to give at least two full strength stick pushes plus three reduced strength pushes. The low pressure nitrogen tops up a low pressure accumulator 62 which supplies the power for the aforementioned pushes. The low pressure nitrogen is held by the first of the two electrically operated selector valves 55 and 56 which are connected in series in the pressure line. These valves are identical to each other and each comprises a simple spool valve with O ring seatings. They are normally spring biased in the "vented" position. Each valve is opened by energising a solenoid (not shown) which is connected directly to the spool valve to enable nitrogen to flow. On cancellation of the electric signal to the solenoid the spring will close the valve venting the downstream passage to atmosphere while closing off the upstream passage. Both valves 55 and 56 are energised and opened simultaneously when a stall warning signal has armed the relays 49 and 50 and has been followed by a stall identification signal in the correct sequence and within a time limit to operate the relays. After passing through the two selector valves 55 and 56, the nitrogen passes into the pneumatic ram 36.

With some aircraft it is possible to use a simple type of ram which gives a substantially constant push throughout its stroke, without risk of subjecting the aircraft to excessive loads. With other aircraft which respond more rapidly to the controls, it is necessary to limit the force applied to the control column at the end of the stroke of the ram so that it will be impossible to generate a negative "G" increment on the aircraft in excess of unity. This is achieved by using a two stage ram as shown in FIG. 2.

The ram itself comprises a piston 63 on to which the low pressure nitrogen from the pressure inlet 64 can impinge through passage 65, the piston rod 66 passing through a seal 67 in a dividing wall 68 and abutting on to a second piston 69. The piston rod 66 is hollow and transmits pressure from the inlet 64 to the head of the second piston 69, whose piston rod 70 is connected to a striking lever 71 (FIG. 1) freely pivoted on the same axis as the cable quadrant 72 which drives the elevator control circuit. A light return spring 73 (FIG. 2) abuts against piston 69 and a pre-compressed spring 74 is housed so as to be contacted by the piston 69 during its stroke.

In operation, low pressure nitrogen enters the ram via the inlet 64 and impinges simultaneously on to piston 63 and piston 69. The integrated push of these two pistons adds up to, say, 100 lbs. at the pilot's hands. After the two pistons have travelled to a position corresponding to, say, 1.9° of elevator movement past the neutral position, piston 63 is stopped from travelling further by contact with the wall 68. At the same time piston 69 contacts the end of the pre-compressed spring 74. At this stage all push is lost from piston 63 and that of piston 69 is reduced by the pre-compression of the spring 74 thus leaving an effective push of, say, 34 lbs. Continued movement of piston 69 will meet with increasing resistance from the spring 74 until at the full stroke of the ram only, say, 16½ lbs. push is available at the pilot's hands.

The mechanism is adjusted so that when the control column 37 is fully aft against its stops, there is a travel of, say, 0.2 inch of the ram before the striking lever 71 contacts the abutment on the cable quadrant 72. This ensures that during normal operation of the controls the pilot does not have to move the ram. This is a safety feature because control of the aircraft would not be affected if for some reason the ram pistons seized.

The output force of the ram is arranged in the above described fashion to ensure that at all times the aerodynamic response of the aircraft to the movement of its controls will generate a negative G increment less than unity.

Cancellation of the stall identification signals will cause both selector valves 55 and 56 to close and vent to atmosphere. Thus pressure in the ram 36 will fall to zero and the two springs 73 and 74 will return the pistons 63 to the 1.9° position and thereafter the light return spring 73 will return both pistons to the basic position indicated.

A dump valve 75 is tapped off the pressure pipe between the selector valve 56 and the ram 36 and can be manually operated in emergency. This valve is normally closed.

In his cockpit the pilot is presented with the following information:

(1) A gauge 76 showing the pressure of the H.P. nitrogen.
(2) A gauge 77 showing the pressure of the L.P. nitrogen supply.
(3) A warning light 78 indicating failure of the L.P. nitrogen.
(4) A system fail light 79 which is connected to the lock out relay 57.
(5) A light 80 indicating the operation of valve 55.
(6) A light 81 indicating the operation of valve 56.
(7) A central warning light 82 which is also connected to the lock out relay 57.
(8) A stall identification light 83 which is operated by a microswitch on lever 71.

The system fail light 79 and central warning light 82 will operate if there is any electrical failure in the system or when the stick push system is energised before the stick shaker sub-system or when the stick shaker system is not followed by cancellation or by stick push within 60 seconds. In these events the pilot is instructed to operate the dump valve 75 which releases the pressure in the system and operates the kill switch 76 to isolate the stick push system. Once this is done the stick push system remains inoperative throughout the remainder of the flight. It can only be re-set on the ground, thereby ensuring that the system does not remain only partially effective.

Although the apparatus described employs pairs of incidence sensors 30, 31 and 34, 35, it is evident that a single sensor, or more than two sensors, may be used to produce the stall warning signal or the stall identification signal.

What I claim as my invention and desire to secure by Letters Patent is:

1. Stall warning and correcting apparatus for use in aircraft comprising, incidence sensing means for producing a first and a second signal at predetermined aircraft angles of incidence, stall warning means responsive to said signals, and elevator-operating means for operating the elevators of the aircraft, said elevator-operating means being responsive to said second signal, and said aircraft having a gas turbine jet propulsion engine and comprising igniting means responsive to said second signal.

2. Stall warning and correcting apparatus for use in aircraft comprising, incidence sensing means for producing a first signal when the aircraft angle of incidence exceeds a first value and for producing a second signal subsequent to said first signal when the aircraft angle of incidence exceeds a second value higher than said first value, stall warning means for warning the pilot of an imminent stall, first transmitting means connecting said stall warning means with said incidence sensing means for transmitting said first signal to said stall warning means to actuate the latter, so that said stall warning means responds to said first signal, elevator-operating means for operating elevators of the aircraft, and second transmitting means connecting said elevator-operating means with said incidence sensing means for transmitting said second signal to said elevator-operating means to actuate the latter to provide a pitch down motion to the aircraft in the event that the pilot has not responded to said stall warning means and taken corrective action to prevent the aircraft from exceeding said second value of said angle of incidence.

3. Stall warning and correcting apparatus as recited in claim 2, and wherein said incidence sensing means includes a first incidence sensing structure for producing said first signal and a second incidence sensing structure for producing said second signal.

4. Stall warning and correcting apparatus for use in aircraft comprising, incidence sensing means for producing a first and a second signal at predetermined aircraft angles of incidence, stall warning means responsive to said signals, elevator-operating means for operating the elevators of the aircraft, said elevator-operating means being responsive to said second signal for operating the elevators of the aircraft, and means for preventing actuation of said elevator-operating means in response to said second signal unless said second signal has been preceded within a given time interval by said first signal.

5. Stall warning and correcting apparatus according to claim 4, wherein said means for preventing actuation of said elevator-operating means comprise comparison means for indicating the sequence of production of said signals, a lock-out relay responsive to said comparison means, and a kill switch responsive to said comparison means.

6. Stall warning and correcting apparatus for use in aircraft having a pilot control column comprising, incidence sensing means for producing a first and a second signal at predetermined aircraft angles of incidence, stall warning means responsive to said signals, and a two-stage fluid pressure operated ram responsive to said second signal for producing a varying force on the pilot control column.

7. Apparatus according to claim 6, wherein said ram comprises an output member, two pistons in series and cooperating with said output member and an abutment for preventing further movement of one of said pistons after said output member has moved a predetermined distance.

8. Apparatus according to claim 6, wherein said ram comprises an output member, a first and second piston in series and cooperating with said output member, a fixed abutment adapted to prevent movement of said first piston after said output member has moved a pre-determined distance, and a spring abutment cooperating with said second piston for variably reducing said force.

9. Apparatus according to claim 6, including a dump valve for releasing pressure from said fluid pressure operated ram and simultaneously inhibiting production of said second signal.

References Cited by the Examiner
UNITED STATES PATENTS

| | | |
|---|---|---|
| 2,297,412 | 9/1942 | Hoppe. |
| 3,041,833 | 7/1962 | Vore _____ 60—39.09 |
| 3,076,624 | 2/1963 | Lewis. |

FERGUS S. MIDDLETON, *Primary Examiner.*

MILTON BUCHLER, ANDREW H. FARRELL,
*Examiners.*